(12) United States Patent
Byford

(10) Patent No.: US 6,220,509 B1
(45) Date of Patent: Apr. 24, 2001

(54) PARCEL TRACE SYSTEM

(75) Inventor: Derrick John Byford, London (GB)

(73) Assignee: International Business Machines, Corporation, Armonk, NY (US)

( * ) Notice: Subject to any disclaimer, the term of this patent is extended or adjusted under 35 U.S.C. 154(b) by 0 days.

(21) Appl. No.: 09/113,806

(22) Filed: Jul. 9, 1998

(30) Foreign Application Priority Data

Dec. 18, 1997 (GB) .................................................. 9726740

(51) Int. Cl.[7] .................................................. G06F 17/00
(52) U.S. Cl. .............................................. 235/375; 705/1
(58) Field of Search .................... 705/1, 26; 235/375; 707/1, 10

(56) References Cited

U.S. PATENT DOCUMENTS

| | | | |
|---|---|---|---|
| 5,631,827 | * 5/1997 | Nicholls et al. | 395/228 |
| 5,804,803 | * 9/1998 | Cragun et al. | 235/375 |
| 5,869,819 | * 2/1999 | Knowles et al. | 235/375 |
| 5,970,472 | * 10/1999 | Allsop et al. | 705/26 |
| 6,047,053 | * 4/2000 | Miner et al. | 379/201 |
| 6,047,264 | * 4/2000 | Fisher et al. | 705/26 |
| 6,070,793 | * 6/2000 | Reichl et al. | 235/375 |

FOREIGN PATENT DOCUMENTS

WO 97/08628 A1 6/1997 (WO).

* cited by examiner

Primary Examiner—Michael G. Lee
Assistant Examiner—Jamara A. Franklin
(74) Attorney, Agent, or Firm—David M. Shofi; Anne Vachon Dougherty

(57) ABSTRACT

A parcel trace system for tracing parcels handled by a service provider for a plurality of clients. The system includes relay (30) adapted to communicate with the clients across the Internet and with a server database. The server database stores a plurality of parcel objects, each parcel object including a parcel identifier attribute and a parcel location attribute. The server database further includes a URL attribute for each client. A client database (80) includes a plurality of parcel objects, each object corresponding to a parcel being handled for the client and including a parcel identifier and a parcel location attribute. A client database controller (70) communicates with the relay, and across a second network, possibly the Internet with the client. The relay is responsive to a change in state of the parcel location attribute to relay the change in state of the parcel location attribute to the client database controller across the Internet. The client database controller responds to receipt of the change in state of parcel location to write the change of state to the client database. The client database controller is further responsive to parcel location requests from the client across the second network to return a location and a parcel identifier for any parcels requested by the client.

10 Claims, 2 Drawing Sheets

PARCEL TRACE SYSTEM

TECHNICAL FIELD

The present invention relates to an improved parcel trace system.

BACKGROUND OF THE INVENTION

FIG. 1 shows a conventional parcel trace system. A parcel delivery service provider, for example, Federal Express, UPS or DHL, assigns a unique parcel identification, known as an Air Bill number, to each parcel. This is done by providing to a client two-part blank forms, each including a unique pre-printed bar code, corresponding to the Air Bill number, on each part of the form. One part of a form is attached to the parcel, while the client retains the other part of the form including a copy of the barcode affixed to the parcel. The parcel identification barcode is scanned at a number of locations worldwide at each stage of delivery to track its progress. The barcode scanner communicates with a host computer 10 to transmit the parcel ID to the host computer. The parcel ID and its location information are transmitted by the host computer 10 to one or more web servers 60 (only one shown) each including a database table 20 maintained by the service provider.

The client, running a web browser 90, is able to link through the Internet 40 to the service provider web server 60, and thus the database table 20, by specifying a URL (universal resource location). The URL usually points to a HTML file which is transmitted to the client who is then prompted to enter the unique parcel ID and optionally the client ID, for security reasons. These are transmitted to the service provider web server 60 and used as search criteria by the service provider, which returns the current location of the client's parcel to the browser 90 for display.

A problem exists where a large client may use a variety of delivery service providers, each with different web pages, to send multiple parcels. It is a time consuming exercise to track these parcels, with separate parcel identifications to be entered for each parcel, and separate service provider web pages to be accessed.

It is an object of the present invention to provide a parcel trace system capable of accommodating single-point tracking by a client of a plurality of parcels being handled by a number of different delivery service companies.

SUMMARY OF THE INVENTION

Accordingly, in a first aspect, the present invention provides a parcel trace system for tracing parcels handled by a service provider for a plurality of clients, said system including relay means adapted to communicate with said clients across a first network and with a server database, said server database being adapted to store a plurality of parcel objects, each parcel object including a parcel identifier attribute and a parcel location attribute, said server database further including a first network address attribute for said clients and wherein said relay means is responsive to a change in state of said parcel location attribute to relay said change in state of said parcel location attribute across said first network to a client for whom said parcel is being handled.

In a second aspect, the invention provides a parcel trace system for tracing parcels handled by a plurality of service providers for a client, said system including a client database controller and a client database, said client database including a plurality of parcel objects, each parcel object corresponding to a parcel being handled for said client and including a parcel identifier and a parcel location attribute, said client database controller being adapted to communicate across a first network with a plurality of relay means, each associated with a respective service provider, and across a second network with said client, each relay means being responsive to a change in state of a parcel location handled by an associated service provider to relay said change in state to said client database controller across said first network, said client database controller being responsive to receipt of said change in state of parcel location to write said change of state to said client database, said client database controller being further responsive to parcel location requests from said client across said second network to return a parcel location and a parcel identifier for any parcels requested by said client.

DESCRIPTION OF PREFERRED EMBODIMENT

Figure 1:
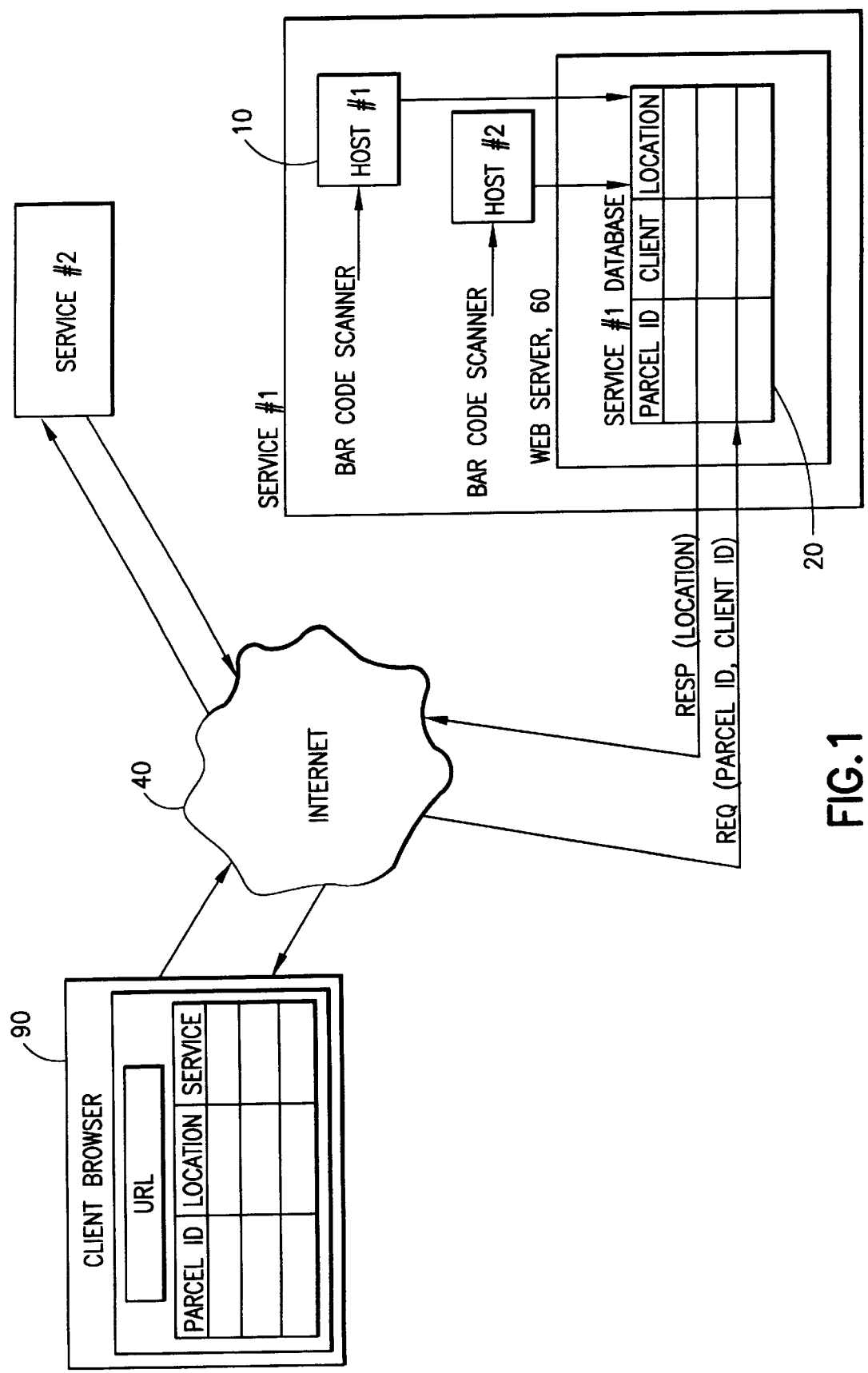
FIG. 1 is a schematic view of a conventional parcel trace system.
Figure 2:
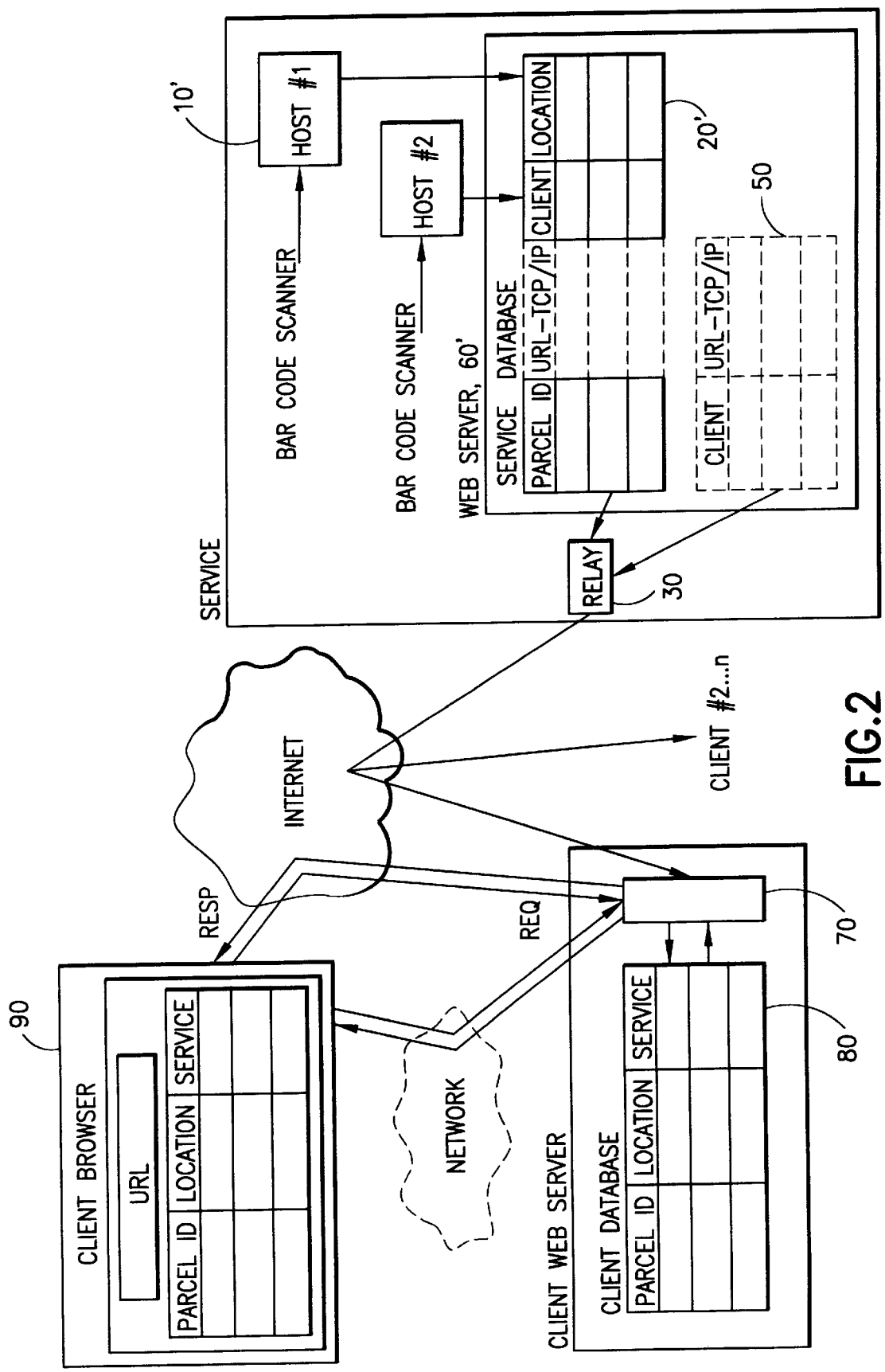
FIG. 2 is a schematic view of a parcel trace system according to the present invention.

In a first embodiment of the invention, FIG. 2, a client uses conventional barcode generating software to generate barcoded labels for parcels. The software enables the client to encode a URL or possibly a TCP/IP address, a parcel identification code, and other optional information (eg update authorization) and print this information as a barcoded label that is physically applied to the packaging of a parcel or other item for delivery.

A delivery service picks up the parcel and at various intermediate locations in the course of delivery of the parcel, the delivery service scans the barcode, usually with a hand held scanner, and the barcode information is dumped to a host machine 10' at the location. The barcoded information is transmitted by the host 10' to a delivery service web server 60' in a conventional manner. The server 60' translates the barcode information into the client's URL and parcel identification code and stores this information as a parcel object in a database table 20'. In the first embodiment, the table 20' includes a parcel ID, a URL or TCP/IP address, an optional client ID and a location attribute.

In order to ensure secure access to parcel location information, the database may already have received the client information associated with a parcel from when the parcel was picked up by the service provider. Alternatively, the information can be included in the barcode and inserted in the database table 20' whenever it is updated with location information.

Relay software 30 on the delivery service's server 60' or connected to this server continually monitors, or is triggered by changes in the database table 20'. When a parcel object is updated with new location information, the software 30 establishes a link to the Internet and accesses the client's parcel tracking home page using the scanned URL. In one embodiment of the invention, the clients home page resides on a web server with a CGI-BIN standard back end controller 70 controlling access to a database table 80. Thus, the URL is of the form:

"http://domain/path/update.cgi-bin/parcelID+location+service"

This URL connects the relay software 30 to the specified path on the specified domain and will cause the back end controller 70 to execute a script file called "update." "parcelID+location+service" are passed as parameters to the script file which, for example, calls a database program to write or update a parcel object with the new location and service provider information. An example of a suitable database management system which could be employed for implementing the database table 80 or the table 20' is DB2 produced by IBM. It will be seen that the invention is not limited to CGI-BIN and other examples of back-end controllers are PERL or ISAPI produced by Microsoft.

In a similar manner to writing the information, a client browser 90 retrieves information from the database 80 using a URL of the form:

"http://domain/path/retrieve.cgi-bin/criteria"

In this case, a script file "retrieve" is called by the back-end controller 70 with a set of criteria, possibly "null" if all parcel information is to be retrieved, and the location for each parcel selected from the database is returned for display on the client browser 90.

If a TCP/IP address is used, then the relay software can connect in a peer to peer manner with the client's web server and write the information to the database 80 in any manner the client and service provider may agree on.

In any case, the software 30 provides the parcel reference code, optionally the name of the delivery service provider, and the parcel location information for insertion into the client's parcel tracking database 80.

It will be seen that the database 80 can be accessed by a client running a conventional browser using either the Internet or Intranet. The client can use conventional CGI-BIN requests or a dedicated applet to retrieve and display the information, or if the client is using another type of network, a dedicated application program could be written to access the database 80.

In any case, the database 80 can be interrogated to display the location of the parcel, and any other of the client's parcels, in an appropriate form on a page that is accessible only by the client.

It will be seen that the delivery service company effectively 'echoes' its tracking of the parcel directly onto the client's webpage. All the clients parcels, with whatever service, thus appear on the same page and the client does not need to access systems and enter codes individually for every item (there could be hundreds).

The benefit is that a large client can track all of its parcels in one go, and with any number of delivery services using the system. A postroom can display the relevant webpage showing the delivery status of all items constantly and just refresh it every now and then.

It will be seen that because every client's TCP/IP or URL address is unique, there will be no conflict between barcodes produced by different clients for different service providers.

In a second embodiment of the invention, the client needs to register with a delivery service in advance of sending parcels. At registration, the client provides his TCP/IP address or the URL of his parcel tracking data capture home page to the delivery service. This is recorded by the delivery service in a database table 50 having only a client ID and a URL - TCP/IP address attributes for future use.

The client's software generates barcodes on adhesive labels in the conventional manner. There is no need to include the client's URL or TCP/IP address, only the parcel ID and any other optional information. Thus, the table 20' in the second embodiment does not include the URL or TCP/IP address attribute of the first embodiment.

The delivery service scans the barcode on the parcel in the same way as in the first embodiment, however, the delivery service's relay software 30 in this case uses the database table 50 to lookup up the client's URL using the unique client reference code associated with a parcel.

The advantage of the first embodiment is that there is no requirement for pre-registration with a delivery service and the parcel may be sent with any delivery service using the described system. It does, however, require delivery services to be able to adapt to a change in the format of their bar codes.

The advantage of the second embodiment is that access to the client's parcel tracking data access home page is secure and only accessible by authorised delivery services. The delivery services need only install the relay software 30, for forwarding updated location information to a client.

It will be seen that the location attribute of the database table 20' of either embodiment can be in a variety of formats. The location may be a simple set of states such as "to be picked up", "in transit", "delivered" or its state may reflect the actual geographical location of the package.

It will be seen that both embodiments share the advantage that a client can keep more useful information on its own database 80, than would the service provider on their database tables 20 or 20'. A client could therefore flag the postroom with the urgency of delivery of a parcel, or with a contact name to call when the parcel is delivered.

What is claimed is:

1. A parcel trace system for tracing parcels handled by a service provider for a plurality of clients, said system including:

relay means adapted to securely communicate with said clients across a first network and with a server database;

a server database adapted to store a plurality of parcel objects, each parcel object including a parcel identifier attribute and a parcel location attribute, said server database further including a first network address attribute for each specific one of said clients;

and wherein said relay means is responsive to a change in state of said parcel location attribute to automatically and securely relay said change in state of said parcel location attribute across said first network to the specific client for whom said parcel is being handled.

2. A parcel trace system as claimed in claim 1 in which said server database includes a first table comprising a parcel identifier, a network address and a location attribute for each parcel object.

3. A parcel trace system as claimed in claim 1 in which said server database includes a first table comprising a parcel identifier, a network address, a client identifier and a location attribute for each parcel object, and a second table comprising a client identifier and a network address attribute for each client.

4. A parcel trace system as claimed in claim 1 in which said network address attribute is a universal resource location attribute.

5. A parcel trace system for tracing parcels handled by a service provider for a plurality of clients, said system including:

relay means adapted to communicate with said clients across a first network and with a server database;

a server database adapted to store a plurality of parcel objects, each parcel object including a parcel identifier attribute and a parcel location attribute, said server database further including a first network address attribute for said clients;

and wherein said relay means is responsive to a change in state of said parcel location attribute to relay said change in state of said parcel location attribute across said first network to a client for whom said parcel is being handled;

a client database, said client database including a plurality of parcel objects, each object corresponding to a parcel being handled for said client and including a parcel identifier and a parcel location attribute and a client database controller being adapted to communicate across said first network with said relay means, and across a second network with said client and wherein said relay means is adapted to relay said change in state of said parcel location attribute to said client database controller across said first network, said client database controller being responsive to receipt of said change in state of parcel location to write said change of state to said client database, said client database controller being further responsive to parcel location requests from said client across said second network to return a location and a parcel identifier for any parcels requested by said client.

6. A parcel trace system as claimed in claim 5 in which said first and second networks are the Internet.

7. A parcel trace system for tracing parcels handled by a plurality of service providers for a client, said system including a client database controller and a client database, said client database including a plurality of parcel objects, each parcel object corresponding to a parcel being handled for said-client and including a parcel identifier and a parcel location attribute, said client database controller being adapted to communicate across a first network with a plurality of relay means, each associated with a respective service provider, and across a second network with said client, each relay means being responsive to a change in state of a parcel location handled by an associated service provider to relay said change in state to said client database controller across said first network, said client database controller being responsive to receipt of said change in state of parcel location to write said change of state to said client database, said client database controller being further responsive to parcel location requests from said client across said second network to return a parcel location and a parcel identifier for any parcels requested by said client.

8. A parcel trace system as claimed in claim 7 in which said server database includes a first table comprising a parcel identifier, a network address and a location attribute for each parcel object.

9. A parcel trace system as claimed in claim 7 in which said server database includes a first table comprising a parcel identifier, a network address, a client identifier and a location attribute for each parcel object, and a second table comprising a client identifier and a network address attribute for each client.

10. A parcel trace system as claimed in claim 7 in which said network address attribute is a universal resource location attribute.

\* \* \* \* \*